United States Patent
Kwak et al.

(10) Patent No.: US 10,333,113 B2
(45) Date of Patent: *Jun. 25, 2019

(54) RECHARGEABLE BATTERY HAVING RETAINER

(71) Applicant: SAMSUNG SDI CO., LTD., Yongin-si, Gyeonggi-do (KR)

(72) Inventors: Seung-Ho Kwak, Yongin-si (KR); Yong-Chul Seo, Yongin-si (KR); Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 425 days.

This patent is subject to a terminal disclaimer.

(21) Appl. No.: 14/099,823

(22) Filed: Dec. 6, 2013

(65) Prior Publication Data

US 2014/0377639 A1 Dec. 25, 2014

Related U.S. Application Data

(60) Provisional application No. 61/837,031, filed on Jun. 19, 2013.

(51) Int. Cl.
*H01M 2/06* (2006.01)
*H01M 2/02* (2006.01)
(Continued)

(52) U.S. Cl.
CPC .......... *H01M 2/06* (2013.01); *H01M 2/0217* (2013.01); *H01M 2/18* (2013.01); *H01M 2/263* (2013.01); *H01M 10/049* (2013.01)

(58) Field of Classification Search
CPC ...... H01M 2/06; H01M 2/263; H01M 2/0217; H01M 2/18; H01M 10/049
See application file for complete search history.

(56) References Cited

U.S. PATENT DOCUMENTS 8,501,341 B2 8/2013 Byun
8,628,878 B2 1/2014 Kim et al.
(Continued)

FOREIGN PATENT DOCUMENTS

CN 101997104 A 3/2011
CN 102290550 A 12/2011
(Continued)

OTHER PUBLICATIONS

EPO Search Report dated Oct. 22, 2014, for corresponding European Patent application 14155603.5, (6 pages).
(Continued)

*Primary Examiner* — Milton I Cano
*Assistant Examiner* — Jennifer A Moss
(74) *Attorney, Agent, or Firm* — Lewis Roca Rothgerber Christie LLP

(57) ABSTRACT

A rechargeable battery including: an electrode assembly; a case containing the electrode assembly; a cap plate covering an opening of the case; a terminal extending outside the cap plate; a lead tab connecting the electrode assembly to the terminal; and a retainer coupled to the lead tab inside the case and arranged between the lead tab and the case, the retainer including an insertion guide facing away from the electrode assembly and being inclined toward the electrode assembly in a direction extending away from the cap plate.

19 Claims, 15 Drawing Sheets

(51) Int. Cl.
*H01M 2/18* (2006.01)
*H01M 2/26* (2006.01)
*H01M 10/04* (2006.01)

(56) References Cited

U.S. PATENT DOCUMENTS

| | | | |
|---|---|---|---|
| 8,728,643 | B2 | 5/2014 | Byun |
| 8,822,065 | B2 | 9/2014 | Byun et al. |
| 9,608,256 | B2 * | 3/2017 | Kwak ................. H01M 2/34 |
| 2006/0024578 | A1 | 2/2006 | Lee |
| 2010/0323239 | A1 | 12/2010 | Kim |
| 2011/0039152 | A1 * | 2/2011 | Kim ................. H01M 2/1022 |
| | | | 429/178 |
| 2011/0200865 | A1 | 8/2011 | Byun et al. |
| 2011/0244281 | A1 | 10/2011 | Byun |
| 2011/0250491 | A1 | 10/2011 | Kim et al. |
| 2011/0311851 | A1 | 12/2011 | Shinoda et al. |
| 2012/0258338 | A1 | 10/2012 | Kim |
| 2012/0282502 | A1 | 11/2012 | Kim |
| 2012/0321922 | A1 | 12/2012 | Kim et al. |
| 2013/0065100 | A1 | 3/2013 | Kim |
| 2013/0078505 | A1 | 3/2013 | Kim et al. |
| 2013/0136961 | A1 | 5/2013 | Han et al. |
| 2014/0322578 | A1 | 10/2014 | Shinoda et al. |

FOREIGN PATENT DOCUMENTS

| | | | |
|---|---|---|---|
| CN | 102738423 A | | 10/2012 |
| CN | 101834305 B | | 12/2012 |
| CN | 103035855 A | | 4/2013 |
| EP | 2 544 264 A1 | | 1/2013 |
| EP | 2 544 265 A1 | | 1/2013 |
| EP | 2 579 357 A1 | | 4/2013 |
| EP | 2 581 965 A1 | | 4/2013 |
| EP | 2 587 567 A1 | | 5/2013 |
| JP | 2011-40381 A | | 2/2011 |
| JP | 2011-171286 A | | 9/2011 |
| JP | 2011-222474 A | | 11/2011 |
| JP | 2012-15102 A | | 1/2012 |
| JP | 2012-227110 A | | 11/2012 |
| JP | 2013-73936 A | | 4/2013 |
| KR | 10-2011-0095108 | | 8/2011 |
| KR | 10-2011-0114411 | | 10/2011 |
| KR | 10-1174899 | | 8/2012 |
| KR | 10-2012-0124026 A | | 11/2012 |
| KR | 10-2013-0063247 | | 6/2013 |

OTHER PUBLICATIONS

EPO Office Action dated Jul. 17, 2017, for corresponding European Patent Application No. 14155603.5 (5 pages).
SIPO Office Action, with English translation, dated Dec. 1, 2017, for corresponding Chinese Patent Application No. 201410277007.8 (17 pages).
SIPO Office Action, with English translation, dated Sep. 25, 2017, corresponding to Chinese Patent Application No. 201410242641.8 (10 pages).
EPO Search Report dated Jun. 17, 2014, corresponding to European Patent application 14160862.0, (4 pages).
EPO Office action dated Sep. 14, 2015, corresponding to European Patent application 14160862.0, (3 pages).
U.S. Office Action dated Sep. 4, 2015, issued in U.S. Appl. No. 14/135,339 (17 pages).
U.S. Final Office Action dated Mar. 8, 2016, issued in U.S. Appl. No. 14/135,339 (15 pages).
U.S. Advisory Action dated Jun. 9, 2016, issued in U.S. Appl. No. 14/135,339 (4 pages).
U.S. Office Action dated Jul. 15, 2016, issued in U.S. Appl. No. 14/135,339 (14 pages).
U.S. Notice of Allowance dated Nov. 10, 2016, issued in U.S. Appl. No. 14/135,339 (8 pages).
SIPO Office Action, with English translation, dated Aug. 13, 2018, for corresponding Chinese Patent Application No. 201410277007.8 (15 pages).

* cited by examiner

RECHARGEABLE BATTERY HAVING RETAINER

CROSS-REFERENCE TO RELATED APPLICATION

This application claims priority to and the benefit of U.S. Provisional Application No. 61/837,031, filed on Jun. 19, 2013 in the U.S. Patent and Trademark Office, the entire content of which is incorporated herein by reference.

BACKGROUND

1. Field

Aspects of embodiments of the present disclosure relate to a rechargeable battery.

2. Description of the Related Art

Rechargeable batteries are batteries that may be repeatedly charged and discharged, unlike primary batteries. Small-capacity rechargeable batteries can be used for small portable electronic devices, such as a mobile phone, a laptop computer, and a camcorder, and large-capacity batteries can be used as a power supply, such as for driving a motor in hybrid vehicles and electric vehicles.

For example, rechargeable batteries include an electrode assembly for charging and discharging, a case containing the electrode assembly and an electrolyte solution, a cap plate coupled to the opening of the case, and a lead tab electrically connecting the electrode assembly to electrode terminals.

The rechargeable batteries are assembled by the process of connecting the lead tab to the electrode assembly, connecting the lead tab to the electrode terminals on the cap plate, and inserting the electrode assembly into the case. In this process, the electrode assembly may not be smoothly inserted into the case and may be damaged by the opening of the case.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery has a structure allowing smooth and easy insertion of an electrode assembly into a case.

According to one or more exemplary embodiments of the present invention, a rechargeable battery includes: an electrode assembly; a case containing the electrode assembly; a cap plate covering an opening of the case; a terminal extending outside the cap plate; a lead tab connecting the electrode assembly to the terminal; and a retainer coupled to the lead tab inside the case and arranged between the lead tab and the case, the retainer including an insertion guide facing away from the electrode assembly and being inclined toward the electrode assembly in a direction extending away from the cap plate.

The insertion guide may include an inclined surface between the electrode assembly and the case and facing away from the electrode assembly.

The retainer may include: a first side facing an end of the electrode assembly; and second and third sides extending from opposite sides of the first side, and a portion of the lead tab may be received between the second and third sides.

The insertion guide may include an angled outer portion of the retainer between the second and third sides at an end of the first side distal from the cap plate.

The lead tab may include: a first connecting portion connected to the terminal and extending parallel to the cap plate; and a second connecting portion bent away from the first connecting portion and connected to the electrode assembly.

The second connecting portion may include a pair of second connecting portions attached to opposite sides of the electrode assembly adjacent the end of the electrode assembly.

The retainer may further include a reinforcing portion protruding from the first side.

The reinforcing portion may be between the pair of second connecting portions.

The reinforcing portion may be in close contact with the lead tab.

The retainer may further include a gap absorbing portion protruding between the second and third sides from the first side.

The gap absorbing portion may be in close contact with inner sides of the second connecting portions.

The gap absorbing portion may include support protrusions protruding toward and contacting the second connecting portions.

A portion of the electrode assembly may be between one of the pair of second connecting portions and the second side of the retainer, and another portion of the electrode assembly may be between the other of the pair of second connecting portions and the third side of the retainer.

The second connecting portion may face the first side of the retainer and be attached to the end of the electrode assembly.

The retainer may further include locking protrusions protruding toward each other from the second and third sides.

The locking protrusions may be received in openings formed in the lead tab.

The locking protrusions may be in close contact with the lead tab.

The second and third sides of the retainer may cover respective sides of an uncoated portion of the electrode assembly and outer surfaces of a portion of the lead tab fixed to the uncoated portion of the electrode assembly.

The retainer may include an electrically insulating material.

The lead tab and the retainer may be arranged at a first side the electrode assembly, and the rechargeable battery may further include: another terminal extending outside the cap plate; another lead tab connecting the electrode assembly to the another terminal; and another retainer coupled to the another lead tab inside the case and arranged between the another lead tab and the case at a second side of the electrode assembly opposite the first side, the another retainer including another insertion guide facing away from the electrode assembly and being inclined toward the electrode assembly in the direction extending away from the cap plate.

According to another exemplary embodiment of the present invention, a rechargeable battery includes: an electrode assembly for charging and discharging, a case receiving the electrode assembly, a cap plate coupled to an opening of the case, electrode terminals disposed in terminal holes of the cap plate, lead tabs connecting the electrode assembly to the electrode terminals, and side retainers supported by the inner sides of the case and coupled to the lead tabs, in which the side retainers each have an insertion guide inclined to be close to the electrode assembly, extending away from the cap plate.

The lead tab may have a first connecting portion connected with the electrode terminal in parallel with the cap plate and bending downward away from the cap plate, and a plurality of second connecting portions extending from the first connecting portion and welded in surface contact with a side of the uncoated portion of the electrode assembly.

The side retainer may have a first side covering the lead tab in the direction facing the end surface of the uncoated portion of the electrode assembly, and a second side and a third side protruding from both sides of the first side and coupled to the lead tab.

The insertion guide may connect the first side, at an angle, to the second side and the third side inclined to the electrode assembly.

The second side and the third side may have locking protrusions locked to the inner sides of the lead tabs across the sides of the lead tabs.

The first side may have a reinforcing portion that is thicker than the other portions.

The lead tab may have a first connecting portion connected to the electrode terminal in parallel with the cap plate, and a second connecting portion bending downward from the first connecting portion away from the cap plate and welded in surface contact with an end surface of the uncoated portion of the electrode assembly.

The side retainer may have a first side covering the lead tab in the direction facing the end surface of the uncoated portion of the electrode assembly, and a second side and a third side protruding from both sides of the first side and coupled to the lead tab.

The side retainer may have a gap absorbing portion protruding between the second side and the third side inside the first side and supporting the inner sides of the second connecting portions facing each other of the second and third sides.

The insertion guide may be formed by chamfering the end of the first side toward the electrode assembly.

The side retainer may further have support protrusions protruding from the side of a gap absorbing portion and supporting the inner sides of the second side and the third side, respectively.

The side retainer may have a gap absorbing portion protruding between the second side and the third side, inside the first side, and supporting the inner sides facing each other of the second side and the third side, and a reinforcing portion that is thicker than the other portions, on the inner side of the first side.

According to an aspect of embodiments of the present invention, since the side retainers are coupled to the lead tabs coupled to the electrode assembly, and the side retainers have the inclined insertion guides, the electrode assembly may be safely inserted into the opening of the case by the insertion guide.

BRIEF DESCRIPTION OF THE DRAWINGS

The accompanying drawings, together with the specification, illustrate some exemplary embodiments of the present invention, and, together with the description, serve to explain principles and aspects of the present invention.

DESCRIPTION OF REFERENCE NUMERALS INDICATING SOME ELEMENTS IN THE DRAWINGS

Figure 1:
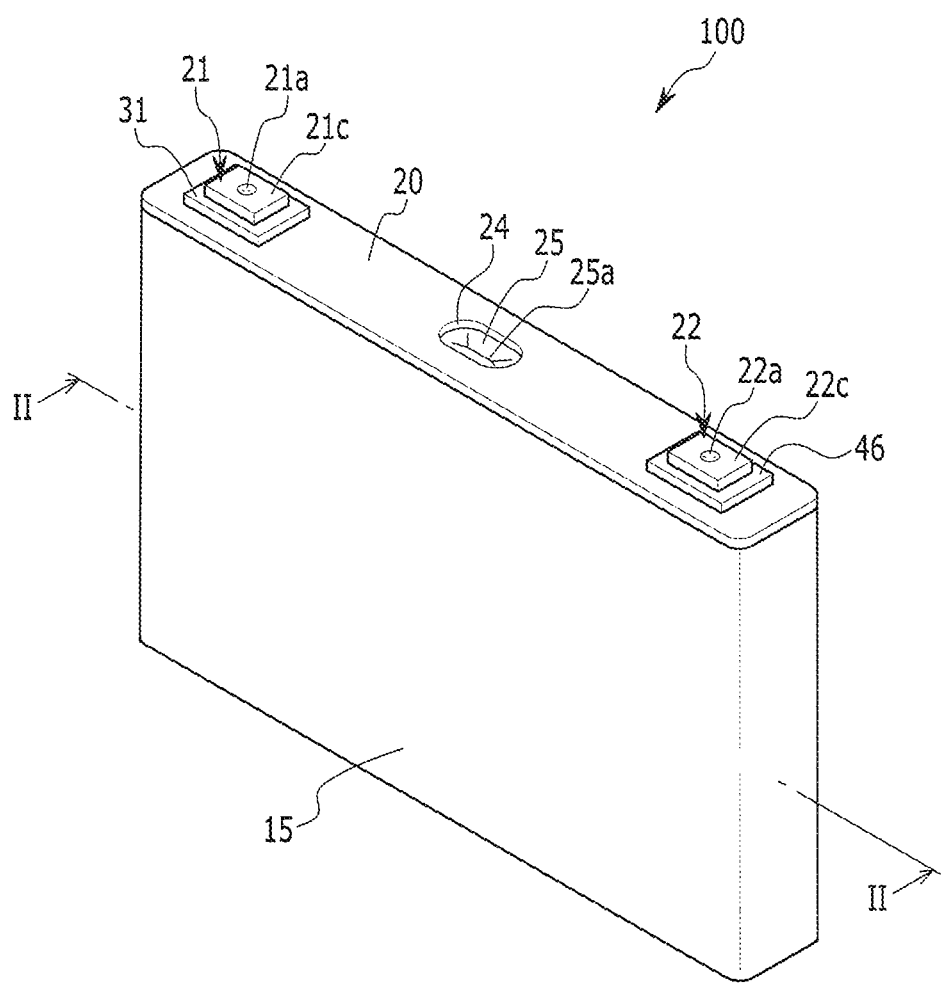
FIG. 1 is a perspective view of a rechargeable battery according to an exemplary embodiment of the present invention.

| | |
|---|---|
| 10: Electrode assembly | 11: Cathode |
| 12: Anode | 11a, 12a: Coated portion |
| 11b, 12b: Uncoated portion | 13: Separator |
| 15: Case | 20: Cap plate |
| 21, 22: Electrode terminal | 21a, 22a: Rivet terminal |
| 21b, 22b: Flange | 21c, 22c: Plate terminal |
| 24: Vent hole | 25: Vent plate |
| 25a: Notch | 31: Insulating member |
| 36, 37: Gasket | 46: Top plate |
| 51, 52, 71: Lead tab | 53, 54, 55, 56, 57, 57', 58: Side retainer |
| 60, 63: Insertion guide | 61, 62: Insulating member |

-continued

| | |
|---|---|
| 73, 74: Through-hole | 100, 300, 500: Rechargeable battery |
| 511, 711: First connecting portion | 512, 712: Second connecting portion |
| 531, 551, 571: First side | 532, 552, 572: Second side |
| 533, 553, 573: Third side | |
| 534, 535, 554, 555, 574, 575: Locking protrusion | |
| 536, 556, 576: Reinforcing portion | 557, 577: Gap absorbing portion |
| 578: Support protrusion | H1, H2: Terminal hole |
| H3, H4: Through-hole | |

DETAILED DESCRIPTION

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
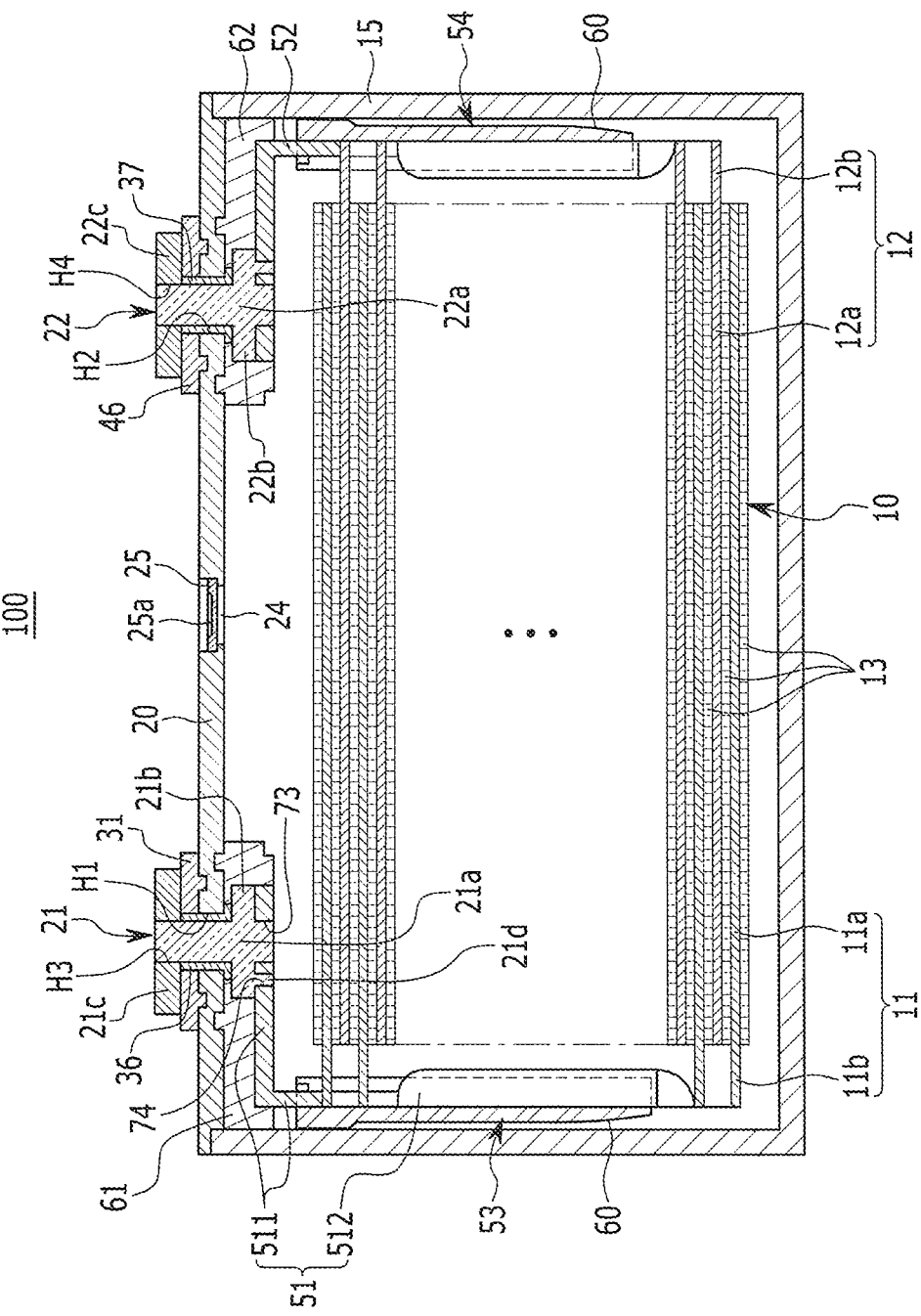
FIG. 2 is a cross-sectional view of the rechargeable battery of FIG. 1, taken along the line II-II.

FIG. 1 is a perspective view of a rechargeable battery according to an exemplary embodiment of the present invention; and FIG. 2 is a cross-sectional view of the rechargeable battery of FIG. 1, taken along the line II-II.

Referring to FIGS. 1 and 2, a rechargeable battery 100 according to an exemplary embodiment of the present invention includes an electrode assembly 10 for charging and discharging with a current, a case 15 containing the electrode assembly 10 and an electrolyte solution, a cap plate 20 coupled to an opening of the case 15, electrode terminals 21 and 22 in terminal holes H1 and H2 of the cap plate 20, and lead tabs 51 and 52 connecting the electrode terminals 21 and 22 to the electrode assembly 10. The rechargeable battery 100 further includes side retainers 53 and 54 coupled to the lead tabs 51 and 52 and supported on the inner sides of the case 15.

In one embodiment, for example, the electrode assembly 10 is formed by disposing electrodes (e.g., a cathode 11 and an anode 12) on both sides of a separator 13, which is an insulator, and winding the cathode 11, the separator 13, and the anode 12 in a jelly roll shape.

The cathode 11 and the anode 12 have coated portions 11a and 12a formed by coating a metal plate collector with an active material, and uncoated portions 11b and 12b formed by exposed collectors that are not coated with an active material, respectively.

The uncoated portion 11b of the cathode 11 is formed at one end of the cathode 11 along the wound cathode 11. The uncoated portion 12b of the anode 12 is formed at one end of the anode 12 along the wound anode 12. The uncoated portions 11b and 12b are disposed at both ends of the electrode assembly 10.

The case 15, in one embodiment, may be a substantially rectangular parallelepiped with a space for containing the electrode assembly 10. The opening of the case 15 is formed at one side of the rectangular parallelepiped and allows the electrode assembly 10 to be inserted into the space from the outside.

The cap plate 20 is disposed at the opening of the case 15 and seals the opening of the case 15. In one embodiment, for example, the case 15 and the cap plate 20 may be made of aluminum and welded to each other. That is, the cap plate 20 may be welded to the case 15 at the opening of the case 15, after the electrode assembly 10 is inserted in the case 15.

The cap plate 20 may have one or more openings, and, in one embodiment, has the terminal holes H1 and H2 and a vent hole 24. The electrode terminals 21 and 22 are disposed in the terminal holes H1 and H2 of the cap plate 20, respectively, and electrically connected to the electrode assembly 10.

That is, the electrode terminals 21 and 22 are electrically connected to the cathode 11 and the anode 12 of the electrode assembly 10, respectively. Accordingly, the electrode assembly 10 can be connected to the outside of the case 15 through the electrode terminals 21 and 22.

The electrode terminals 21 and 22, in one embodiment, respectively have plate terminals 21c and 22c disposed outside of the cap plate 20 at locations corresponding to the terminal holes H1 and H2, and rivet terminals 21a and 22a electrically connected to the electrode assembly 10 and fastened to the plate terminals 21c and 22c through the terminal holes H1 and H2.

The plate terminals 21c and 22c, in one embodiment, may have through-holes H3 and H4, respectively, and the rivet terminals 21a and 22a may be inserted in the through-holes H3 and H4 from above and through the terminal holes H1 and H2.

The electrode terminals 21 and 22, in one embodiment, further have flanges 21b and 22b, respectively, which are formed wide integrally with the rivet terminals 21a and 22a inside the cap plate 20.

In one embodiment, at the electrode terminal 21 connected to the cathode 11, an external insulating member 31 between the plate terminal 21c and the cap plate 20 electrically insulates the plate terminal 21c and the cap plate 20. That is, the cap plate 20 is insulated from the cathode 11.

In one embodiment, the insulating member 31 and the plate terminal 21c are fastened to the upper end of the rivet terminal 21a by coupling the insulating member 31 and the plate terminal 21c to the upper end of the rivet terminal 21a and then riveting or welding the upper end. The plate terminal 21c is disposed outside the cap plate 20 with the insulating member 31 therebetween.

In one embodiment, at the electrode terminal 22 connected to the anode 12, a conductive top plate 46 between the plate terminal 22c and the cap plate 20 electrically connects the plate terminal 22c with the cap plate 20. That is, the cap plate 20 is electrically connected with the anode 12.

In one embodiment, the top plate 46 and the plate terminal 22c are fastened to the upper end of the rivet terminal 22a by coupling the top plate 46 and the plate terminal 22c to the upper end of the rivet terminal 22a and then riveting or welding the upper end. The plate terminal 22c is disposed outside the cap plate 20 with the top plate 46 therebetween.

Gaskets 36 and 37 are disposed respectively between the rivet terminals 21a and 22a of the electrode terminals 21 and 22 and the inner sides of the terminal holes H1 and H2 of the cap plate 20, and seal and electrically insulate the rivet terminals 21a and 22a and the cap plate 20.

The gaskets 36 and 37, in one embodiment, may further seal and electrically insulate the flanges 21b and 22b and the cap plate 20 by further extending between the flanges 21b and 22b and the inner side of the cap plate 20. That is, since the electrode terminals 21 and 22 are disposed on the cap plate 20, the gaskets 36 and 37 prevent or substantially prevent the electrolyte solution from leaking through the terminal holes H1 and H2.

The lead tabs 51 and 52 electrically connect the electrode terminals 21 and 22 to the cathode 11 and the anode 12 of the electrode assembly 10, respectively. In one embodiment, the lead tabs 51 and 52 are supported by the flanges 21b and 22b and connected to the lower ends of the rivet terminals 21a and 22a, respectively, by coupling the lead tabs 51 and 52 to the lower ends of the rivet terminals 21a and 22a and then caulking the lower ends.

In one embodiment, insulating members 61 and 62 are disposed between the lead tabs 51 and 52 and the cap plate 20, respectively, and electrically insulate the lead tabs 51 and 52 and the cap plate 20. The insulating members 61 and 62, in one embodiment, are coupled to the cap plate 20 at one side and cover the lead tabs 51 and 52, the rivet terminals 21a and 22a, and the flanges 21b and 22b at the other side, thereby stabilizing the coupling structures.

The vent hole 24 is covered tightly with a vent plate 25 to be able to discharge an internal pressure and a produced gas of the rechargeable battery 100. When the internal pressure of the rechargeable battery 100 reaches or exceeds a certain pressure (e.g., a predetermined pressure), the vent plate 25 is cut or ruptured and opens the vent hole 24. The vent plate 25, in one embodiment, has a notch 25a to facilitate the cutting or rupturing.

The side retainers 53 and 54 are coupled to the lead tabs 51 and 52 and disposed between the electrode assembly 10 and the case 15, such that they space the electrode assembly 10 from the case 15. Accordingly, the side retainers 53 and 54 protect the electrode assembly 10 against external shock transmitted through the case 15. In one embodiment, the side retainers 53 and 54 may be made of a synthetic resin having high thermal resistance. In one embodiment, the side retainers 53 and 54 may be made of an electrically insulating material.

The side retainers 53 and 54 have an insertion guide 60 extending away from the cap plate 20 and inclined toward the electrode assembly 10. The insertion guide 60 forms a gap from the opening of the case 15 by means of the narrowed side, such that the insertion guide 60 may guide the electrode assembly 10 to be easily inserted into the case 15 through the opening of the case 15.

Further, since the side retainers 53 and 54 may contact the case 15 at the opening of the case 15 outside the electrode assembly 10, they may prevent or substantially prevent the ends of the lead tabs 51 and 52 and the electrode assembly 10 from coming in contact with the opening of the case 15, and damage to the electrode assembly 10 due to the opening of the case 15 is prevented or substantially prevented.

Both of the lead tabs 51 and 52 may have a same structure, and both of the side retainers 53 and 54 may have a same structure according to one embodiment, and, therefore, for convenience, the lead tab 51 connected to the cathode 11 of the electrode assembly 10, and the side retainer 53 coupled to the lead tab 51 are described in the following description.

Figure 3:
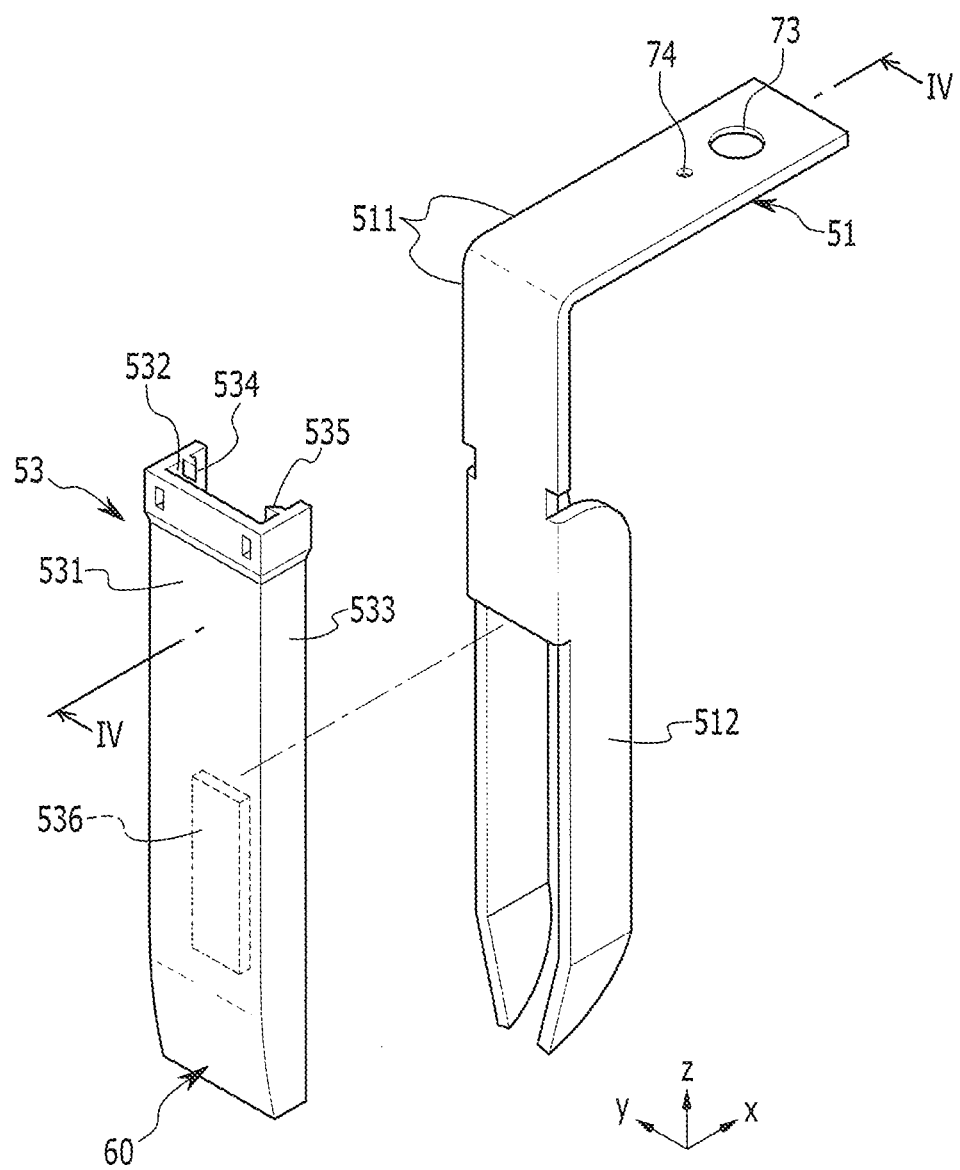
FIG. 3 is an exploded perspective view of a lead tab and a side retainer of the rechargeable battery shown in FIG. 2.
Figure 4:
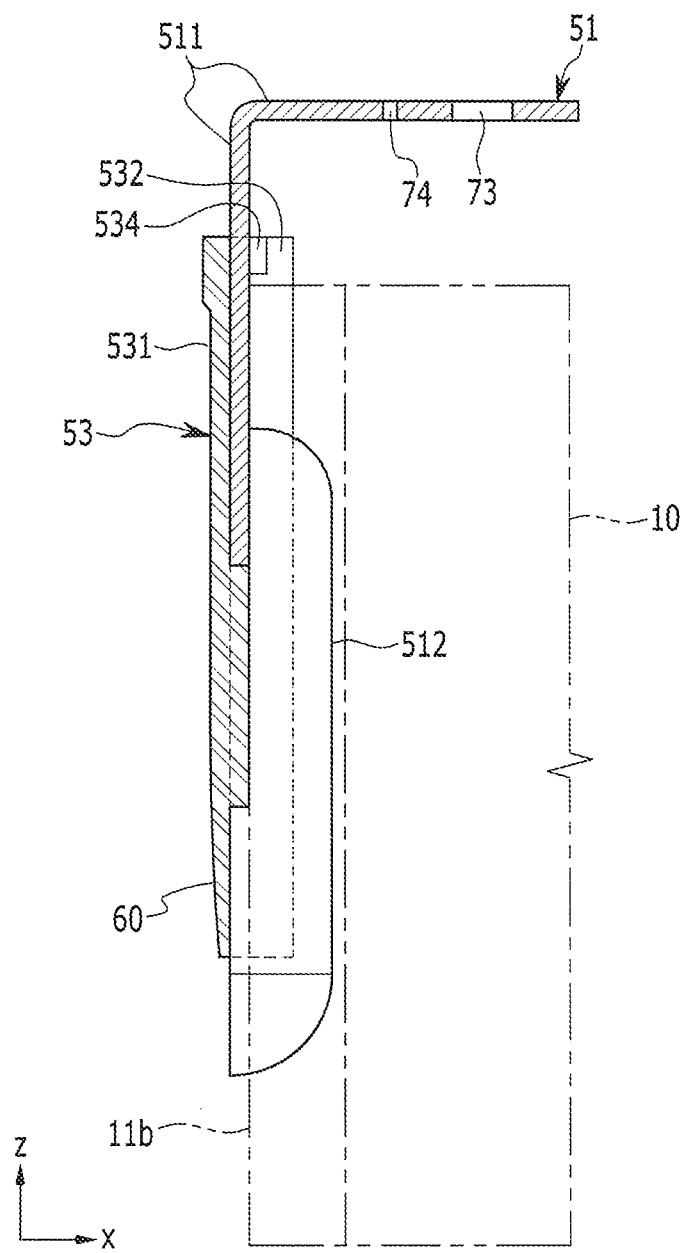
FIG. 4 is a cross-sectional view of the lead tab and the side retainer shown in FIG. 3, taken along the line IV-IV, the side retainer shown coupled to the lead tab.

FIG. 3 is an exploded perspective view of the lead tab 51 and the side retainer 53; and FIG. 4 is a cross-sectional view of the lead tab 51 and the side retainer 53, taken along the line IV-IV of FIG. 3, the side retainer 53 shown coupled to the lead tab 51.

Referring to FIGS. 3 and 4, in one embodiment, the lead tab 51 has a first connecting portion 511 connected with the electrode terminal 21 in parallel with the cap plate 20 and bent downward away from the cap plate 20, and one or more second connecting portions 512 extending from the first connecting portion 511 and welded in surface contact with a side of the uncoated portion 11b of the electrode assembly 10.

The first connecting portion 511, in one embodiment, has through-holes 73 and 74 at the parallel portion to be coupled to the lower end of the rivet terminal 21a and a lower protrusion 21d of the flange 21b. Though not shown, a cell fuse may have an area smaller than other portions at the first connecting portion and higher electrical resistance than the other portions.

The side retainer 53, in one embodiment, has a first side 531 covering a side of the lead tab 51 in a direction (e.g., the x-axis direction) facing the end surface of the uncoated portion 11b of the electrode assembly 10, and a second side 532 and a third side 533 protruding from both sides of the first side 531 and fitted on the inner sides across the end surface of the lead tab 51.

That is, the side retainer 53 is recessed, corresponding to the lead tab 51, and receives the lead tab 51. The first side 531 covers the wider side of the first connecting portion 511 and the narrower end surface of the second connecting portion 512. The second and third sides 532 and 533 cover the narrower end surface of the first connecting portion 511 of the lead tab 51 and the wider side of the second connecting portion 512.

The insertion guide 60 is formed by connecting the first side 531, at an angle, to the second side 532 and the third side 533 inclined toward the electrode assembly 10. That is, as shown in FIGS. 3 and 4, the first side 531 comes gradually closer to the electrode assembly 10 in a direction from the upper end to the lower end. In one embodiment, the insertion guide 60 is an inclined surface facing away from the electrode assembly 10 and inclined toward the electrode assembly 10 in a direction extending away from the cap plate 20. That is, the inclined surface of the insertion guide 60 may be inclined inwardly, i.e. away from a side of the case 15, such that a gap between the side wall of the case 15 and the inclined surface is largest at a lower end of the insertion guide 60 distal from the cap plate 20.

Accordingly, when the electrode assembly 10 is inserted in the case 15, a gap is defined between the side retainer 53 and the case 15 at the opening of the case 15 by the insertion guide 60. The gap allows the electrode assembly 10 to be easily inserted into the opening of the case 15.

The lead tab 51 and the electrode assembly 10 covered by the insertion guide 60 are not in contact with the case 15 at the opening of the case 15. Therefore, damage to the electrode assembly 10 in assembling the rechargeable battery 100 is prevented or substantially prevented.

The second and third sides 532 and 533, in one embodiment, have locking protrusions 534 and 535 on inner sides facing each other, respectively. The locking protrusions 534 and 535 are locked to inner sides across the end surface of the first connecting portion 511 of the lead tab 51, thereby fixing the side retainer 53 to the first connecting portion 511. The second and third sides 532 and 533 cover the end surface of the first connecting portion 511 and also cover the side of the second connecting portion 512.

The first side 531, in one embodiment, has a reinforcing portion 536 that is thicker than other portions, on an inner side of the first side 531. When the first side 531 covers the side of the first connecting portion 511 and the end surface of the second connecting portion 512, the reinforcing portion 536 is inserted between the second connecting portions 512, and the locking protrusions 534 and 535 are in close contact with the inner side of the first connecting portion 511. Therefore, the lead tab 51 and the side retainer 53 may be maintained in a strong coupling state.

Some various other exemplary embodiments of the present invention are described hereafter. Some of the components or portions thereof described hereinafter have a same configuration as those of the embodiment described above, and some having different configurations according to other exemplary embodiments are described.

Figure 5:
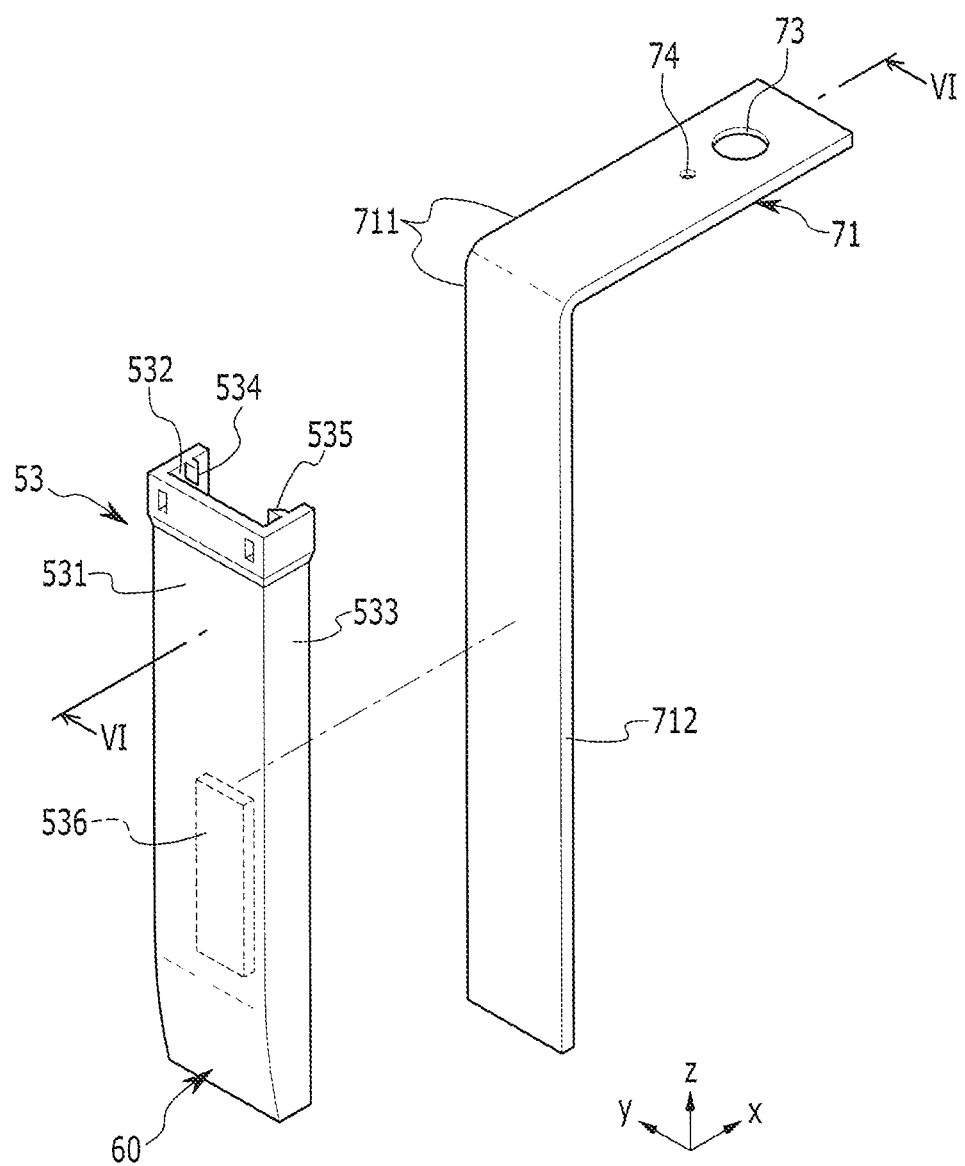
FIG. 5 is an exploded perspective view of a lead tab and a side retainer of a rechargeable battery, according to another exemplary embodiment of the present invention.
Figure 6:
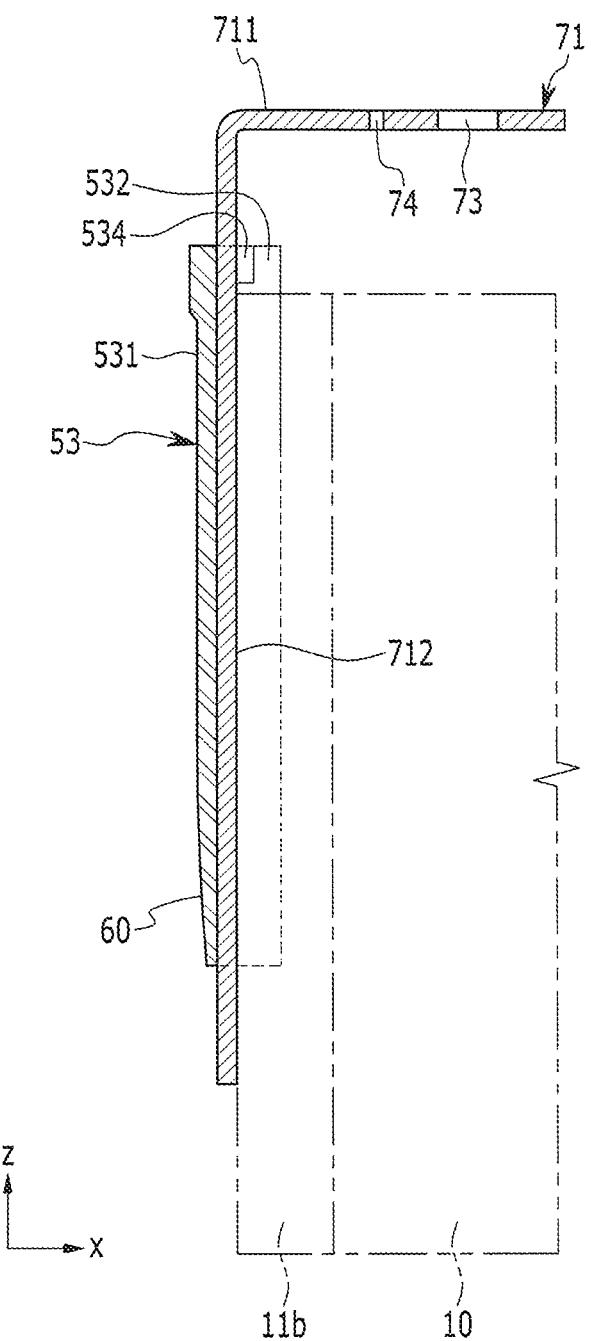
FIG. 6 is a cross-sectional view of the lead tab and the side retainer shown in FIG. 5, taken along the line VI-VI, the side retainer shown coupled to the lead tab.

FIG. 5 is an exploded perspective view of a lead tab and a side retainer of a rechargeable battery, according to another exemplary embodiment of the present invention; and FIG. 6 is a cross-sectional view of the lead tab and the side retainer shown in FIG. 5, taken along the line VI-VI, the side retainer shown coupled to the lead tab.

According to another embodiment of the present invention, a lead tab 71 has a first connecting portion 711 connected to the electrode terminal 21 in parallel with the cap plate 20, and a second connecting portion 712 bent downward from the first connecting portion 711 away from the cap plate 20 and welded in surface contact with an end surface of the uncoated portion 11b of the electrode assembly 10.

According to one embodiment, the side retainer 53 has the first side 531 covering the wider side of the lead tab 71 in a direction (e.g., the x-axis direction) facing the end surface of the electrode assembly 10, and the second side 532 and the third side 533 protruding from both sides of the first side 531 and fitted on the inner sides across a narrower end surface of the lead tab 71.

That is, the side retainer 53 is recessed, corresponding to the lead tab 71, and receives the lead tab 71. The first side 531 covers the wider side of the second connecting portion 712 of the lead tab 71. The second and third sides 532 and 533 cover the narrower end surfaces of the second connecting portion 712 of the lead tab 71.

The locking protrusions 534 and 535 are locked to the inner sides across the end of the second connecting portion 712 of the lead tab 51, thereby fixing the side retainer 53 to the second connecting portion 712. The second and third sides 532 and 533 cover the end surfaces of the second connecting portion 712.

The first side 531, in one embodiment, has the reinforcing portion 536 that is thicker than the other portions, on the inner side. When the first side 531 covers the side of the second connecting portion 712, the reinforcing portion 536 is in close contact with the side of the second connecting portion 712, and the locking protrusions 534 and 535 are in close contact with the inner side of the second connecting portion 712. As such, the lead tab 71 and the side retainer 53 may be maintained in a strong coupling state.

Figure 7:
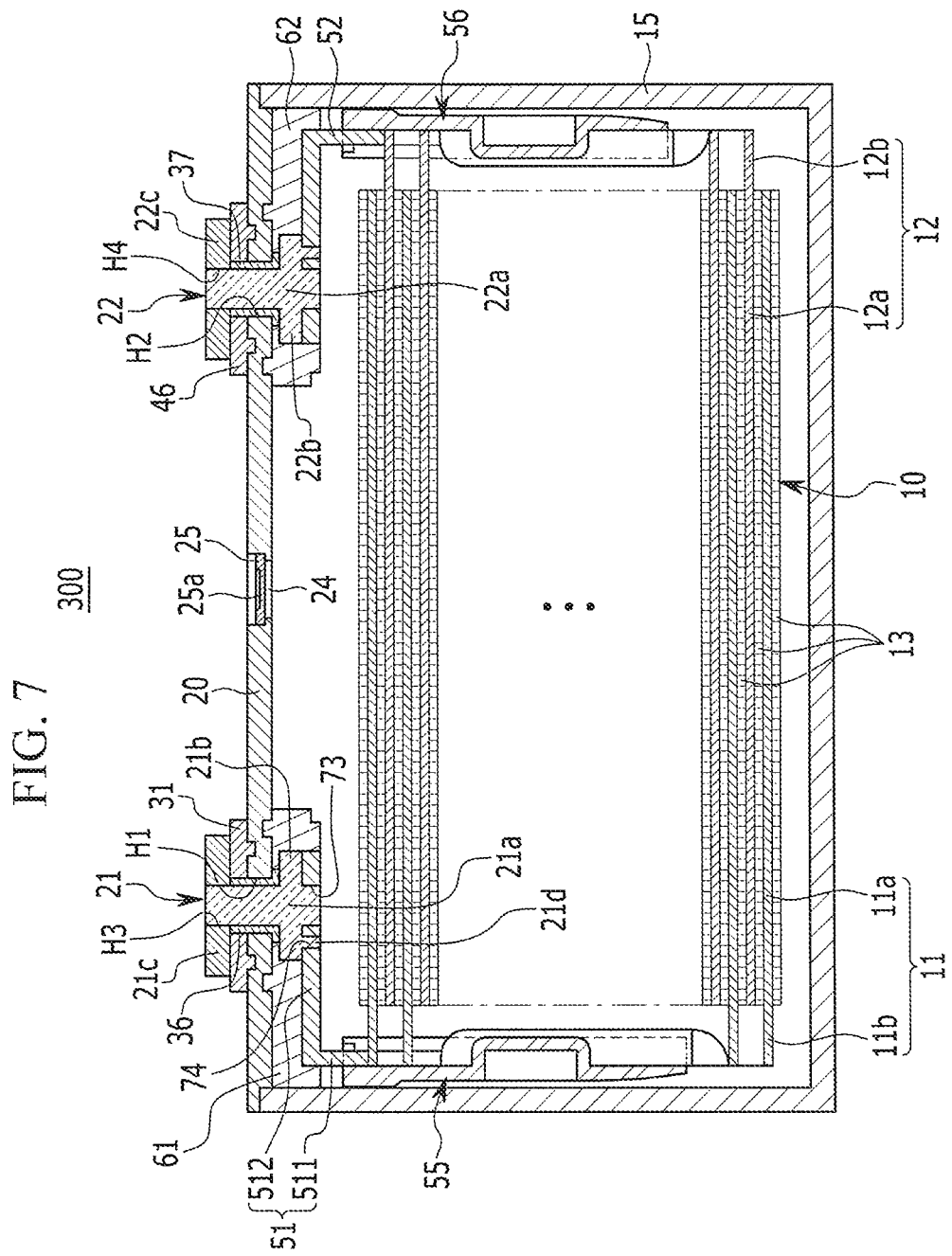
FIG. 7 is a cross-sectional view of a rechargeable battery according to another exemplary embodiment of the present invention.
Figure 8:
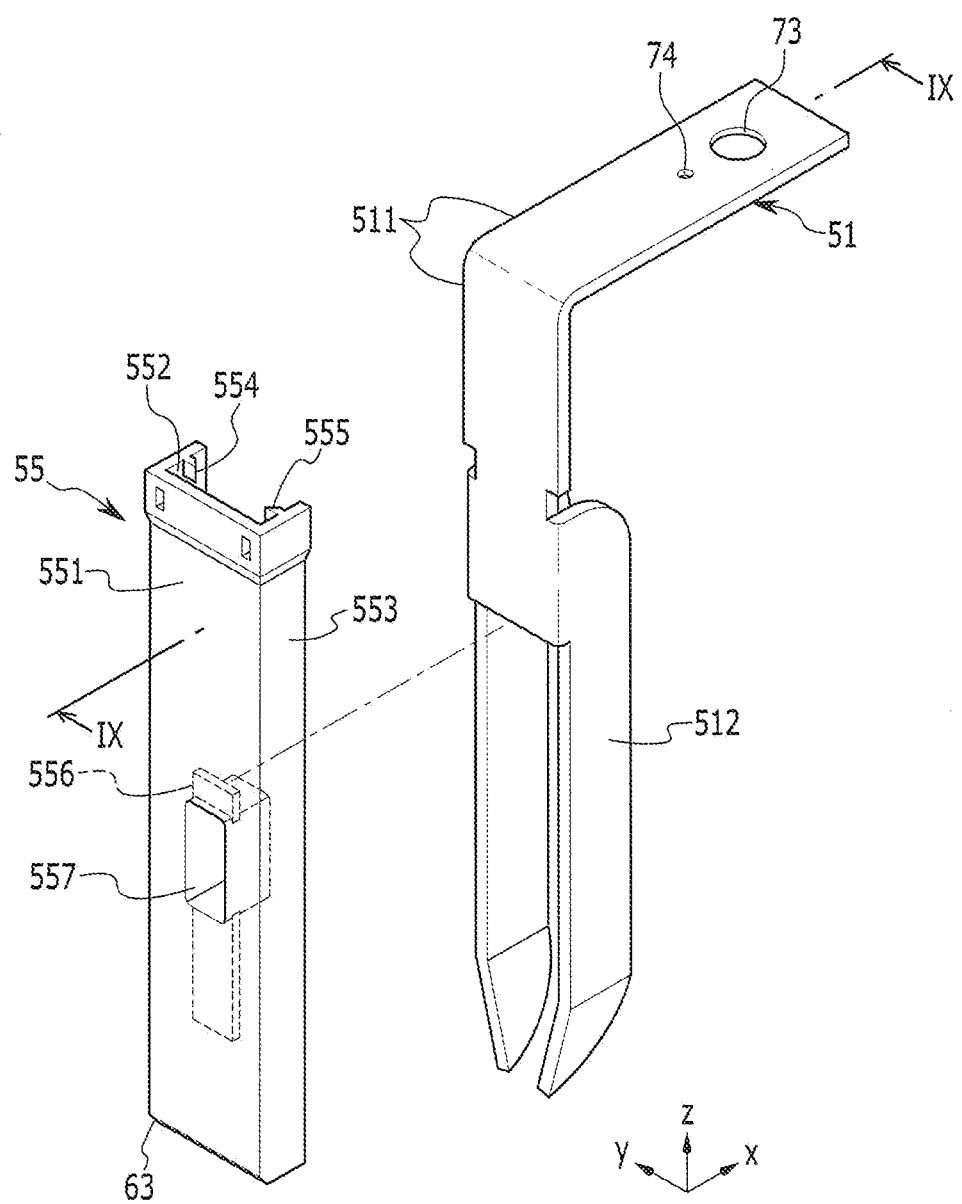
FIG. 8 is an exploded perspective view of a lead tab and a side retainer of the rechargeable battery shown in FIG. 7.

FIG. 7 is a cross-sectional view of a rechargeable battery according to another exemplary embodiment of the present invention; FIG. 8 is an exploded perspective view of a lead tab and a side retainer of the rechargeable battery shown in FIG. 7; and FIG. 9 is a cross-sectional view of the lead tab and the side retainer shown in FIG. 8, taken along the line IX-IX, the side retainer shown coupled to the lead tab.

Figure 9:
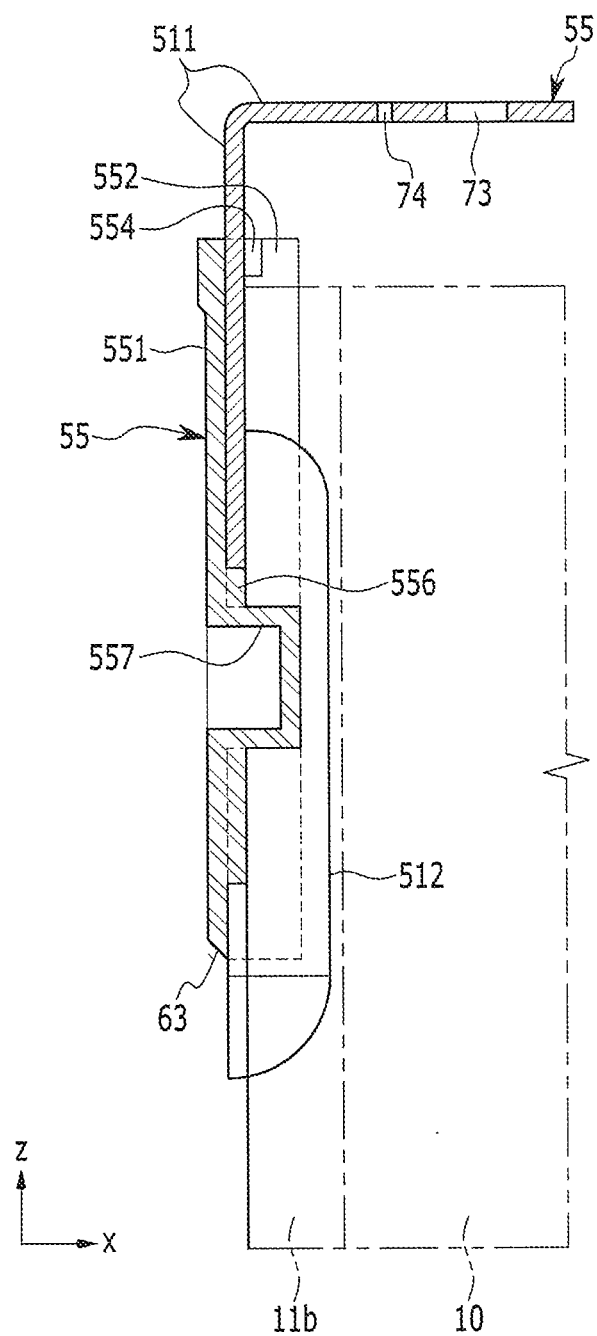
FIG. 9 is a cross-sectional view of the lead tab and the side retainer shown in FIG. 8, taken along the line IX-IX, the side retainer shown coupled to the lead tab.

Referring to FIGS. 7 to 9, in a rechargeable battery 300 according to another exemplary embodiment of the present invention, side retainers 55 and 56 each have a first side 551 covering the lead tab 51 in a direction (e.g., the x-axis direction), facing the end surface of the electrode assembly 10, and a second side 552 and a third side 553 protruding from both sides of the first side 551 and fitted on the inner sides across the end surface of the lead tab 51.

That is, the side retainer 55 is recessed, corresponding to the lead tab 51, and receives the lead tab 51. The first side 551 covers the wider side of the first connecting portion 511 and the narrower end surface of the second connecting portion 512. The second and third sides 552 and 533 cover the narrower end surface of the first connecting portion 511 of the lead tab 51 and the wider side of the second connecting portion 512.

The insertion guide 63, in one embodiment, may be formed by chamfering the end of the first side 551 toward the electrode assembly 10. Accordingly, when the electrode assembly 10 is inserted in the case 15, a gap is defined between the side retainer 55 and the opening of the case 15 by the insertion guide 63. The gap allows the electrode assembly 10 to be easily inserted into the opening of the case 15.

The lead tab 51 and the electrode assembly 10 covered by the side retainer 55 are not in contact with the case 15 at the opening of the case 15. Therefore, damage to the electrode assembly 10 in assembling can be prevented or substantially prevented.

The first side 551, in one embodiment, has a reinforcing portion 556 that is thicker than the other portions, on an inner side of the first side 551. When the first side 551 covers the side of the first connecting portion 511 and the end surface of the second connecting portion 512, the reinforcing portion 556 is inserted between the second connecting portions 512, and locking protrusions 554 and 555 of the side retainer 55 are in close contact with inner sides of the first connecting portion 511. As such, the lead tab 51 and the side retainer 55 may be maintained in a strong coupling state.

The side retainer 55 according to one embodiment further has a gap absorbing portion 557. The gap absorbing portion 557 protrudes between the second side 552 and the third side 553 from the inner side of the first side 551 and supports inner sides of the second connecting portions 512 facing each other between the second and third sides 552 and 553. Therefore, a gap between the side retainer 55 and the lead tab 51 is absorbed and the side retainer 55 may be firmly combined with the lead tab 51.

Figure 10:
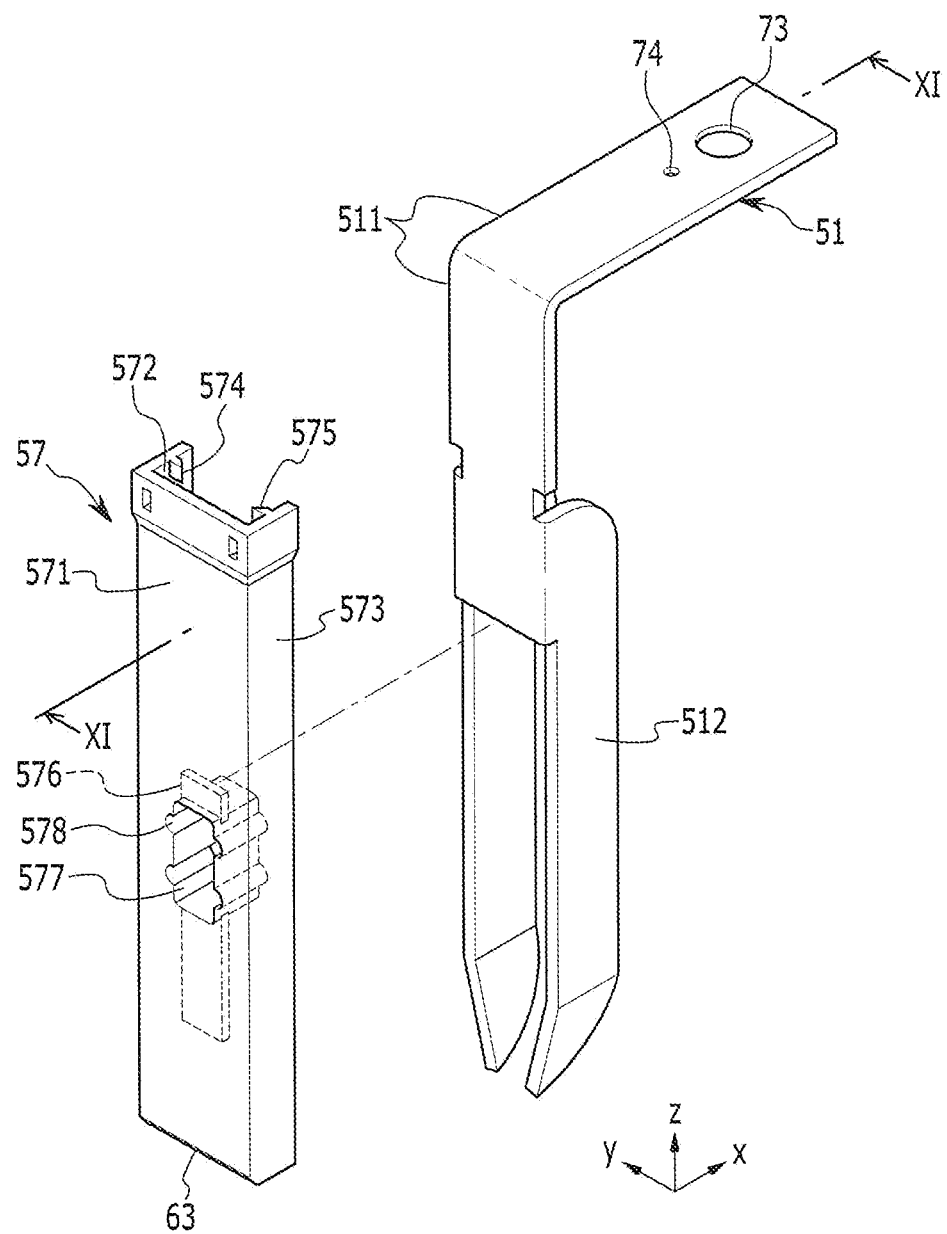
FIG. 10 is an exploded perspective view of a lead tab and a side retainer of a rechargeable battery, according to another exemplary embodiment of the present invention.
Figure 11:
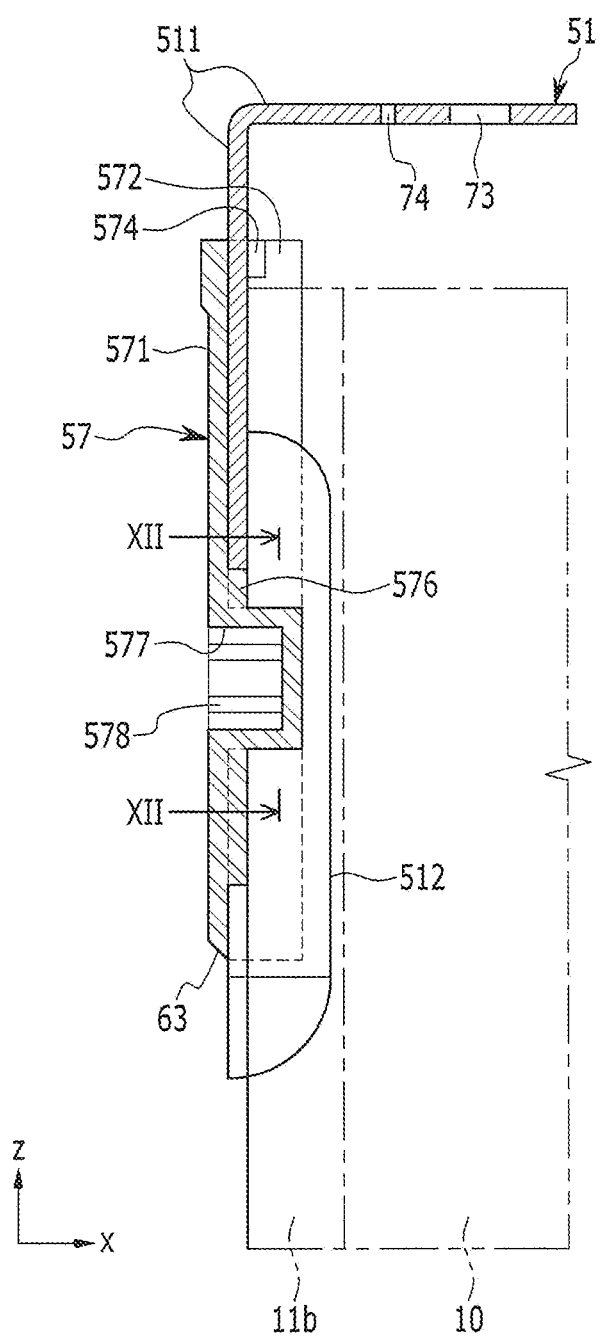
FIG. 11 is a cross-sectional view of the lead tab and the side retainer shown in FIG. 10, taken along the line XI-XI, the side retainer shown coupled to the lead tab.

FIG. 10 is an exploded perspective view of a lead tab and a side retainer of a rechargeable battery, according to another exemplary embodiment of the present invention; FIG. 11 is a cross-sectional view of the lead tab and the side retainer shown in FIG. 10, taken along the line XI-XI, the side retainer shown coupled to the lead tab; and FIG. 12 is a cross-sectional view of the lead tab and the side retainer shown in FIG. 11, taken along the line XII-XII.

Figure 12:
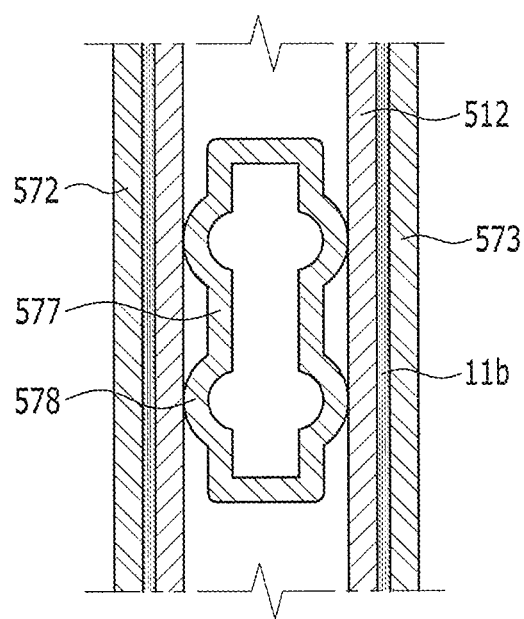
FIG. 12 is a cross-sectional view of the lead tab and the side retainer shown in FIG. 11, taken along the line XII-XII.

Referring to FIGS. 10 to 12, a side retainer 57 further has support protrusions 578 protruding from the side of a gap absorbing portion 577. The support protrusions 578 support the inner sides of the second connecting portion 512, inside a second side 572 and a third side 573.

The support protrusions 578 protrude from the gap absorbing portion 577 toward the second side 572 and the third side 573, inside a first side 571, and support (e.g., in line contact with) the inner sides facing each other of the second connecting portion 512.

Although two support protrusions 578 are shown formed, in other embodiments, one support protrusion or three or more support protrusions may be formed. Locking protrusions 574 and 575 and a reinforcing portion 576 of the side retainer 57 may be the same or similar to the locking protrusions 554 and 555 and reinforcing portion 556, respectively, of the side retainer 55.

The uncoated portion 11b is disposed between the second side 572 and the second connecting portion 512 at one side and between the third side 573 and the second connecting portion 512 at the other side. The uncoated portion 11b is electrically connected to the second connecting portions 512.

Though not shown, in one embodiment, the lead tabs may have different thicknesses at the cathode and the anode, and the second connecting portions of the lead tabs may have different gaps therebetween. In this case, the support protrusions allow the side retainers to be used with the lead tabs having different thicknesses and the second connecting portions having different gaps.

Figure 13:
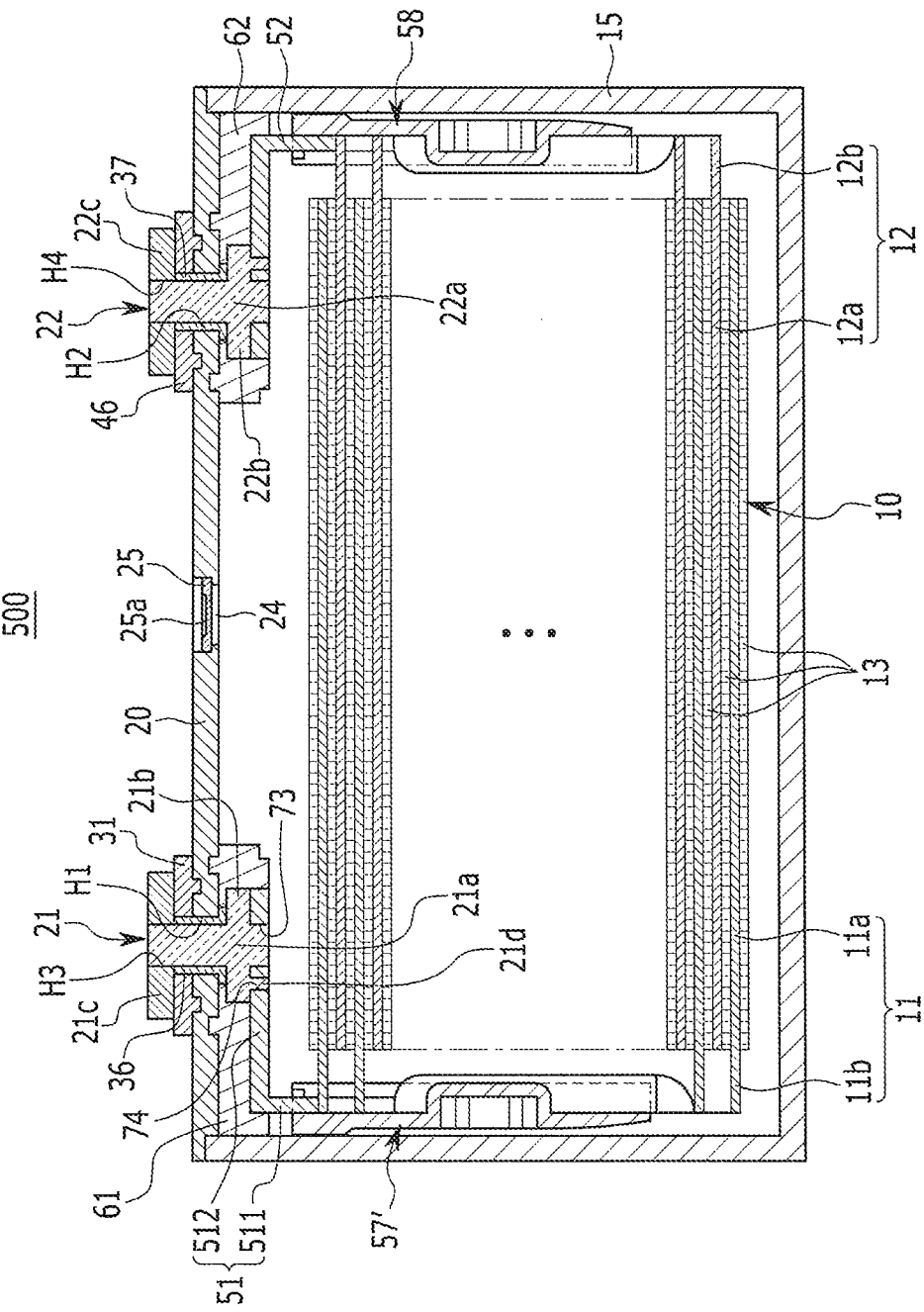
FIG. 13 is a cross-sectional view of a rechargeable battery according to another exemplary embodiment of the present invention.
Figure 14:
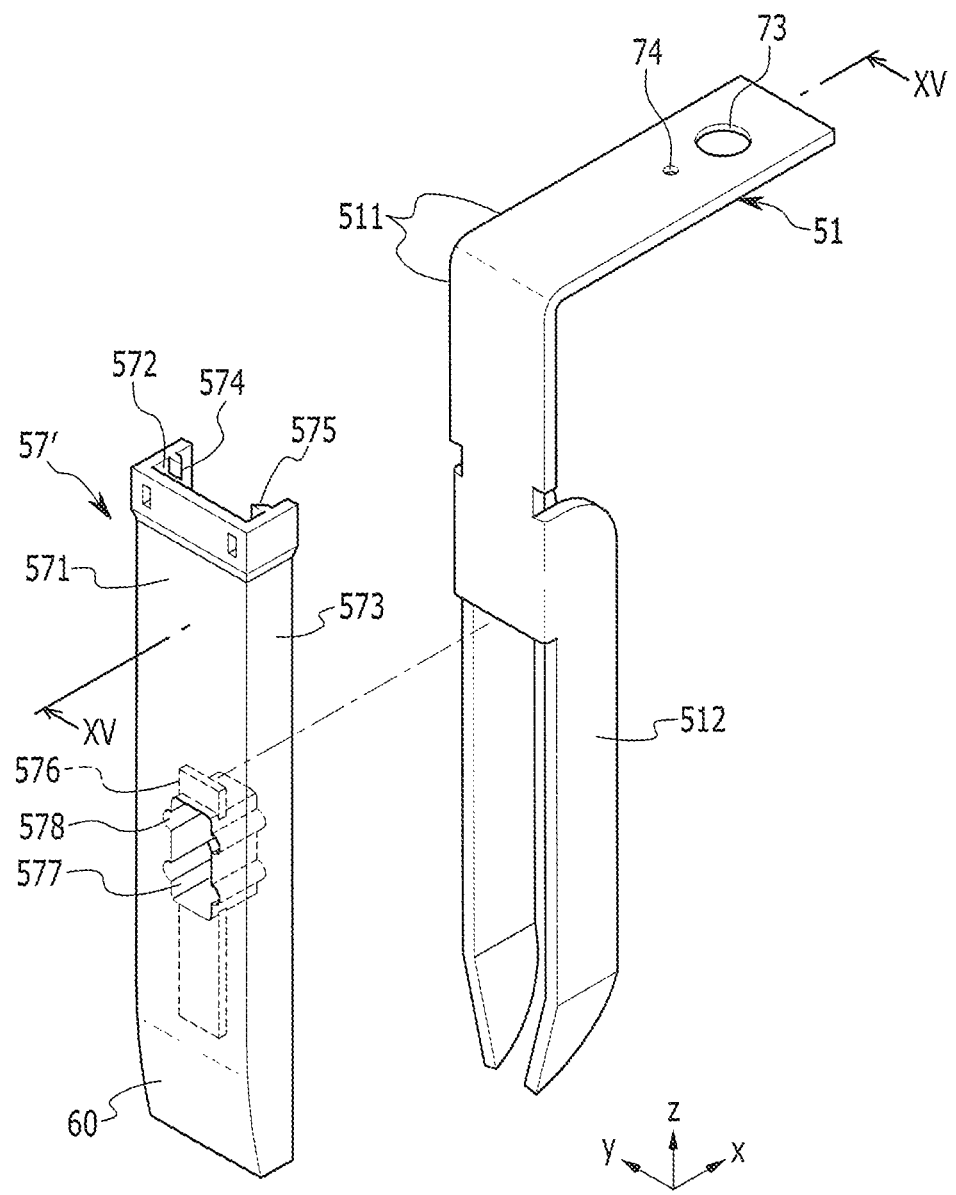
FIG. 14 is an exploded perspective view of a lead tab and a side retainer of the rechargeable battery of FIG. 13.

FIG. 13 is a cross-sectional view of a rechargeable battery according to another exemplary embodiment of the present invention; FIG. 14 is an exploded perspective view of a lead tab and a side retainer of the rechargeable battery of FIG. 13; and FIG. 15 is a cross-sectional view of the lead tab and the side retainer of FIG. 14, taken along the line XV-XV, the side retainer shown coupled to the lead tab.

Figure 15:
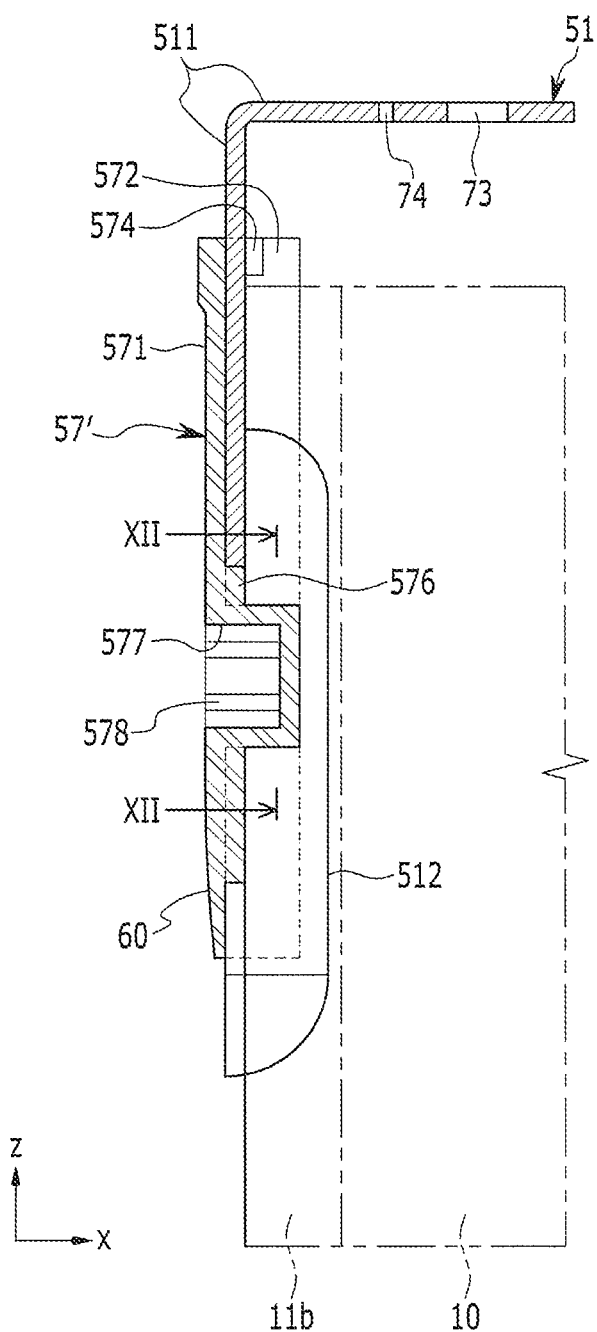
FIG. 15 is a cross-sectional view of the lead tab and the side retainer shown in FIG. 14, taken along the line XV-XV, the side retainer shown coupled to the lead tab.

Referring to FIGS. 13 and 15, in a rechargeable battery 500 according to another exemplary embodiment of the present invention, side retainers 57' and 58 may have all of the features of the configurations of the side retainers 53, 54, 55, 56, and 57 according to the exemplary embodiments described above.

That is, in one embodiment, the side retainer 57' has first, second, and third sides 571, 572, and 573, fitting protrusions 574 and 575, an insertion guide 60, a gap absorbing portion 577, a support protrusion 578, and a reinforcing portion 576. The side retainer 57' can achieve the operational effects of the side retainers 53, 54, 55, 56, and 57 according to the exemplary embodiments described above.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
an electrode assembly comprising a first electrode including a first electrode uncoated portion at a first end of the electrode assembly, and a second electrode including a second electrode uncoated portion at a second end of the electrode assembly, the second end being spaced apart from the first end along a first lengthwise direction;
a case containing the electrode assembly;
a cap plate covering an opening of the case;
a terminal extending outside the cap plate;
a lead tab connecting the electrode assembly to the terminal; and
a retainer coupled to the lead tab inside the case and arranged between the lead tab and the case, the retainer comprising a first side facing the first end of the electrode assembly, and second and third sides extending away from opposite sides of the first side in the first lengthwise direction, the first side comprising an insertion guide comprising an inclined surface between the first end of the electrode assembly and the case and facing away from the electrode assembly in a second lengthwise direction opposite the first lengthwise direction, the inclined surface being inclined toward the second end of the electrode assembly in an insertion direction extending away from the cap plate and connecting to the second side and the third side at an angle such that a thickness of the retainer in the first lengthwise direction gradually decreases along the insertion direction.

2. The rechargeable battery of claim 1,
wherein a portion of the lead tab is received between the second and third sides.

3. The rechargeable battery of claim 2, wherein the insertion guide comprises an angled outer portion of the retainer between the second and third sides at an end of the first side distal from the cap plate.

4. The rechargeable battery of claim 2, wherein the lead tab comprises:
a first connecting portion connected to the terminal and extending parallel to the cap plate; and
a second connecting portion bent away, from the first connecting portion and connected to the electrode assembly.

5. The rechargeable battery of claim 4, wherein the second connecting portion comprises a pair of second connecting portions attached to opposite sides of the electrode assembly adjacent the first end of the electrode assembly.

6. The rechargeable battery of claim 5, wherein the retainer further comprises a reinforcing portion protruding from the first side.

7. The rechargeable battery of claim 6, wherein the reinforcing portion is between the pair of second connecting portions.

8. The rechargeable battery of claim 6, wherein the reinforcing portion is in close contact with the lead tab.

9. The rechargeable battery of claim 5, wherein the retainer further comprises a gap absorbing portion protruding between the second and third sides from the first side.

10. The rechargeable battery of claim 9, wherein the gap absorbing portion is in close contact with inner sides of the second connecting portions.

11. The rechargeable battery of claim 9, wherein the gap absorbing portion comprises support protrusions protruding toward and contacting the second connecting portions.

12. The rechargeable battery of claim 5, wherein a portion of the electrode assembly is between one of the pair of second connecting portions and the second side of the retainer, and another portion of the electrode assembly is between the other of the pair of second connecting portions and the third side of the retainer.

13. The rechargeable battery of claim 4, wherein the second connecting portion faces the first side of the retainer and is attached to the first end of the electrode assembly.

14. The rechargeable battery of claim 2, wherein the retainer further comprises locking protrusions protruding toward each other from the second and third sides.

15. The rechargeable battery of claim 14, wherein the locking protrusions are received in openings formed in the lead tab.

16. The rechargeable battery of claim 14, wherein the locking protrusions are in close contact with the lead tab.

17. The rechargeable battery of claim 2, wherein the second and third sides of the retainer cover respective sides of the first electrode uncoated portion of the electrode assembly and outer surfaces of a portion of the lead tab fixed to the first electrode uncoated portion of the electrode assembly.

18. The rechargeable battery of claim 2, wherein the retainer comprises an electrically insulating material.

19. The rechargeable battery of claim 2,
wherein the lead tab and the retainer are arranged at the first end of the electrode assembly, and
wherein the rechargeable battery further comprises:
  another terminal extending outside the cap plate;
  another lead tab connecting the electrode assembly to the another terminal; and
  another retainer coupled to the another lead tab inside the case and arranged between the another lead tab and the case at the second end of the electrode assembly opposite the first end, the another retainer comprising another insertion guide facing away from the electrode assembly and being inclined toward the electrode assembly in the insertion direction.

\* \* \* \* \*